United States Patent
Magar (10) Patent No.: US 10,073,968 B1
(45) Date of Patent: Sep. 11, 2018

(54) SYSTEMS AND METHODS FOR CLASSIFYING FILES

(71) Applicant: Symantec Corporation, Mountain View, CA (US)

(72) Inventor: Sujit Magar, Shrirampur (IN)

(73) Assignee: Symantec Corporation, Mountain View, CA (US)

( * ) Notice: Subject to any disclaimer, the term of this patent is extended or adjusted under 35 U.S.C. 154(b) by 129 days.

(21) Appl. No.: 15/192,859

(22) Filed: Jun. 24, 2016

(51) Int. Cl.
- *G06F 21/51* (2013.01)
- *G06F 21/55* (2013.01)
- *G06F 21/56* (2013.01)

(52) U.S. Cl.
CPC .............. *G06F 21/55* (2013.01); *G06F 21/51* (2013.01); *G06F 21/56* (2013.01)

(58) Field of Classification Search
CPC ........... G06F 21/51; G06F 21/55; G06F 21/56
See application file for complete search history.

(56) References Cited

U.S. PATENT DOCUMENTS

| | | | | |
|---|---|---|---|---|
| 8,127,358 B1* | 2/2012 | Lee | ........................ | G06F 21/564 726/22 |
| 9,185,119 B1* | 11/2015 | Tamersoy | ................ | H04L 63/14 |
| 2003/0023864 A1* | 1/2003 | Muttik | .................... | H04L 63/145 726/26 |
| 2005/0132184 A1* | 6/2005 | Palliyil | .................... | G06F 21/56 713/152 |
| 2007/0070921 A1* | 3/2007 | Quinlan | ............... | G06Q 10/107 370/254 |
| 2009/0089879 A1* | 4/2009 | Wang | ....................... | G06F 21/53 726/24 |
| 2009/0210944 A1* | 8/2009 | Greiner | .................... | G06F 21/56 726/24 |
| 2012/0110174 A1* | 5/2012 | Wootton | ............... | G06F 21/564 709/224 |
| 2012/0159631 A1* | 6/2012 | Niemela | ............... | G06F 21/564 726/24 |
| 2012/0324579 A1* | 12/2012 | Jarrett | .................... | G06F 21/564 726/24 |
| 2014/0123279 A1* | 5/2014 | Bishop | ................. | H04L 63/1491 726/23 |
| 2014/0165203 A1* | 6/2014 | Friedrichs | ............... | G06F 21/56 726/24 |
| 2015/0096018 A1* | 4/2015 | Mircescu | ................. | G06F 21/56 726/23 |

* cited by examiner

Primary Examiner — Michael Pyzocha
(74) Attorney, Agent, or Firm — FisherBroyles, LLP (57) ABSTRACT

The disclosed computer-implemented method for classifying files may include (i) identifying a point in time before which there is a non-zero probability that at least one file within a group of files has been classified by a security system, (ii) identifying, within the group of files, a file with a timestamp that indicates the file was created or modified before the point in time, (iii) assign, based on the timestamp of the file, a classification to the file that indicates the file is not trusted, and (iv) perform, by the security system, a security action based on the classification of the file. Various other methods, systems, and computer-readable media are also disclosed.

20 Claims, 6 Drawing Sheets

SYSTEMS AND METHODS FOR CLASSIFYING FILES

BACKGROUND

Individuals and organizations typically attempt to protect their computing resources using security software systems. To protect the computing resources, the security software systems may identify suspicious or unknown files on the protected computing resources and then attempt to classify those files as benign or malicious. In the process of identifying the files, the security software products may create a hash of a file and compare the hash to hashes of other known files in a security database. For example, a client-side security agent may compare the hash to hashes of files that the security system has previously encountered and identified. Additionally, or alternatively, the client-side security agent may compare the hash to hashes of other files that are stored in a server-side security database. Similarly, security software systems may analyze the behavior or other attributes of the file in an attempt to estimate whether the file is benign or malicious. Moreover, the vendor of the security software system may also use human experts who manually inspect the file in an attempt to properly classify the file.

The traditional systems for classifying files described above suffer from some disadvantages. The large number of suspicious or unknown files may overwhelm the computing and labor resources of the vendor of the security software system. Moreover, attackers may increase the number of suspicious or unknown files by using polymorphism. Security software systems necessarily commit significant resources to analyzing and classifying the large number of files that are constantly being created and distributed. Consequently, some malicious files may evade detection. Accordingly, the instant disclosure identifies and addresses a need for additional and improved systems and methods for classifying files.

SUMMARY

As will be described in greater detail below, the instant disclosure describes various systems and methods for classifying files by identifying a point in time before which there is a non-zero probability that files on client systems have already been classified. By prioritizing analysis and security actions for files that with timestamps before the point in time that have not been classified yet (or that have weak classifications), the disclosed systems and methods may focus attention on previously undetected potential threats and thereby improve the efficiency and effectiveness of information security systems.

In one example, a computer-implemented method for classifying files may include (i) identifying a point in time before which there is a non-zero probability that at least one file within a plurality of files has been classified by a security system, (ii) identifying, within the files, a file with a timestamp that indicates the file was created or modified before the point in time, (iii) assigning, based on the timestamp of the file, a classification to the file that indicates the file is not trusted, and (iv) performing, by the security system, a security action based on the classification of the file.

In one embodiment, the file had not been assigned a previous classification before being assigned the classification that indicates the file is not trusted. Thus, in this embodiment, assigning the classification to the file includes assigning an initial classification to the file. Some embodiments may include performing an analysis of classifications assigned to files in the plurality of files before the point in time, determining that a classified file has been assigned different classifications by at least two security agents, and, in response to determining that the classified file has been assigned different classifications, assigning an updated classification to the classified file that indicates the file is not trusted. In some embodiments, the security agent may be a client-based agent of the security system, and/or a server-based agent of the security system.

In some embodiments, the non-zero probability that one or more files within the plurality of files have been classified by the security system may be at least 95.4 percent. According to some examples, (i) identifying the point in time includes identifying a most recent time a security scan of the files was performed and (ii) the point in time includes the most recent time of the security scan.

In various embodiments, the security action may include using the assigned classification to prioritize a security analysis of the file. Additionally or alternatively, the security action may include (i) blocking execution of the file on one or more clients, (ii) directing one or more clients to obtain confirmation from a user before executing the file, and/or (iii) submitting the file to a security service for further analysis.

In some examples, a system for implementing the above-described method may include several modules stored in memory, such as (i) an identification module that identifies a point in time before which there is a non-zero probability that at least one file within a group of files has been classified by a security system, (ii) a comparison module that identifies, within the group of files, a file with a timestamp that indicates the file was created or modified before the point in time, (iii) a classification module that assigns, based on the timestamp of the file, a classification to the file that indicates the file is not trusted, and (iv) a security module that performs, by the security system, a security action based on the classification of the file. The system may also include at least one physical processor configured to execute the identification module, the comparison module, the classification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a point in time before which there is a non-zero probability that at least one file within a group of files has been classified by a security system, (ii) identify, within the group of files, a file with a timestamp that indicates the file was created or modified before the point in time, (iii) assign, based on the timestamp of the file, a classification to the file that indicates the file is not trusted, and (iv) perform, by the security system, a security action based on the classification of the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification.

Together with the following description, these drawings demonstrate and explain various principles of the instant disclosure.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for classifying files. As will be explained in greater detail below, the systems and methods described herein may improve the efficiency and effectiveness of security systems by identifying files that may represent an undetected security threat. Additionally, the systems and methods described herein may adjust the expected level of certainty that older files have already been classified to balance the needs for data security and system efficiency.

Figure 1:
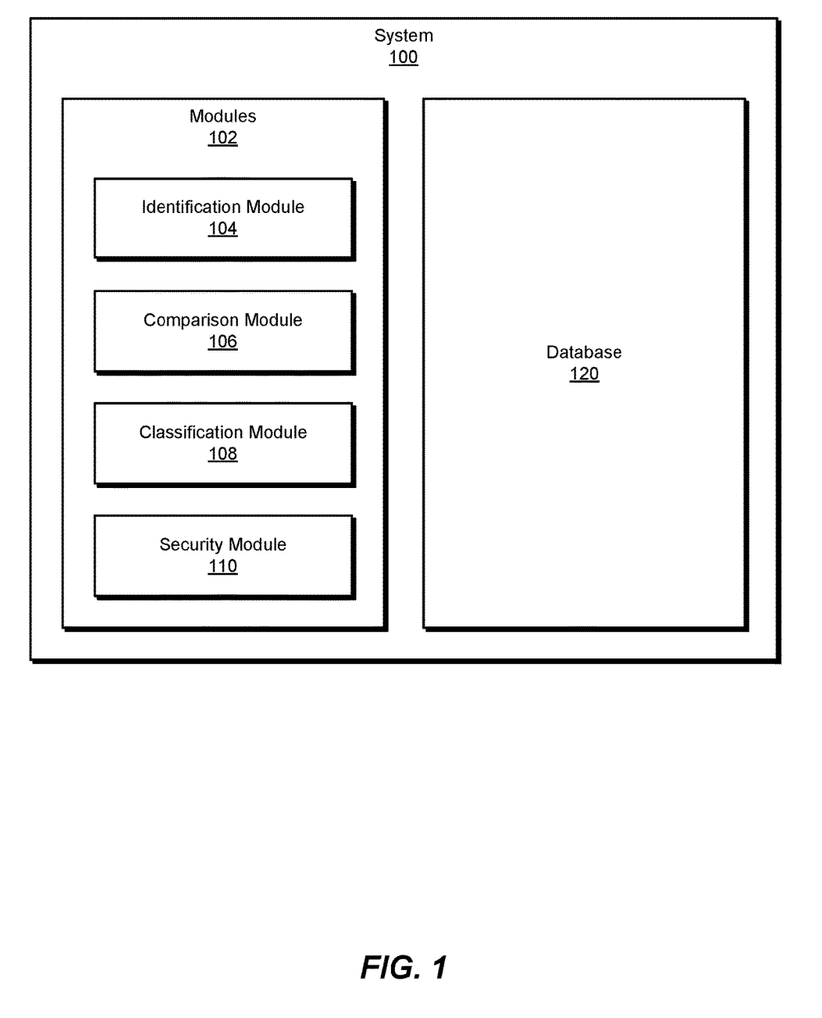
FIG. 1 is a block diagram of a representative system for classifying files.
Figure 2:
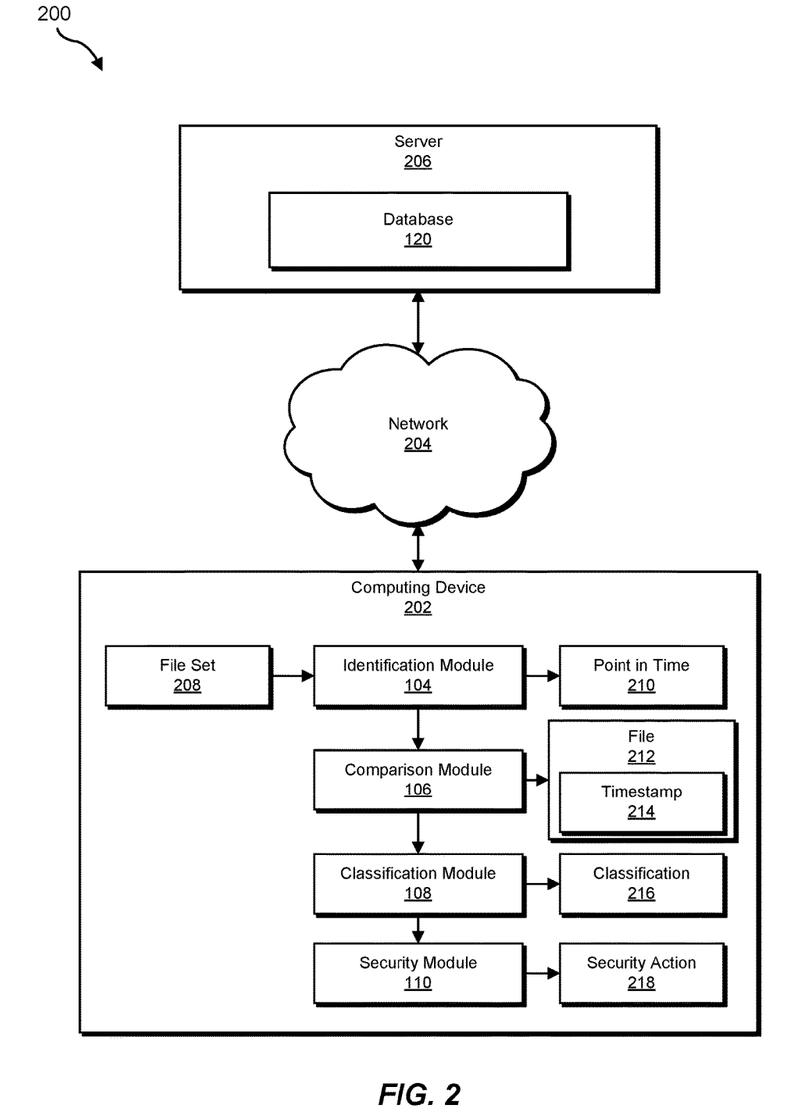
FIG. 2 is a block diagram of an additional representative system for classifying files.

The following will provide, with reference to FIGS. 1-2, detailed descriptions of representative systems for classifying files. Detailed descriptions of corresponding computer-implemented methods will also be provided in connection with FIG. 3. A detailed description of a representative timeline for classifying files will be provided in connection with FIG. 4. In addition, detailed descriptions of a representative computing system and network architecture capable of implementing one or more of the embodiments described herein will be provided in connection with FIGS. 5 and 6, respectively.

FIG. 1 is a block diagram of a representative system 100 for classifying files. As illustrated in this figure, exemplary system 100 may include one or more modules 102 for performing one or more tasks. For example, and as will be explained in greater detail below, exemplary system 100 may include an identification module 104 that identifies a point in time before which there is a non-zero probability that one or more files within a group of files have already been classified by a security system. Exemplary system 100 may additionally include a comparison module 106 that identifies, within the group of files, a file with a timestamp that indicates the file was created or modified before the point in time. Exemplary system 100 may also include a classification module 108 that assigns, based on the timestamp of the file, a classification to the file that indicates the file is not trusted. Exemplary system 100 may additionally include a security module 110 that performs, via the security system, a security action based on the classification of the file. Security module 110 may further perform, by the security system, a security action based on the classification of the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of representative network architecture 600 in FIG. 6. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store file data such as hash values and timestamps, client system identification and configuration data, and client system security policies. Database 120 may represent portions of a single database or computing device or a plurality of databases or computing devices. For example, database 120 may represent a portion of server 206 in FIG. 2, computing system 510 in FIG. 5, and/or portions of representative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of representative network architecture 600 in FIG. 6.

Representative system 100 in FIG. 1 may be implemented in a variety of ways. For example, all or a portion of system 100 may represent portions of representative system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to classify files. For example, and as will be described in greater detail below, one or more of modules 102 may cause computing device 202 and/or server 206 to classify files. Identification module 104 may identify a point in time 210 before which there is a non-zero probability that files within a set of files 208 have been classified by a security system. Comparison module 106 may identify, within a group of files 208, a file 212 with a timestamp 214 that indicates that file 212 was created or modified before point in time 210. Classification module 108 may assign, based on timestamp 214 of file 212, a classification 216 to file 212 that indicates file 212 is not trusted. Security module 110 may perform, in association with the security system, a security action 218 based on classification 216 of file 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 510 in FIG. 5, or any other suitable computing device. In one example, computing device 202 may be part of an information security system that interoperates with server 206 and client agents on several client computing devices.

Server 206 generally represents any type or form of computing device that is capable of receiving, comparing, and storing data. Examples of server 206 include, without limitation, application servers and database servers configured to provide various database services and/or run certain software applications. In one example, server 206 may be part of an information security system that interacts with client agents executing on several client computing devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), representative network architecture 600 in FIG. 6, or the like. Network 204 may facilitate communication or data transfer using wireless or wired connections. In one embodiment, network 204 may facilitate communication between computing device 202 and server 206.

Figure 3:
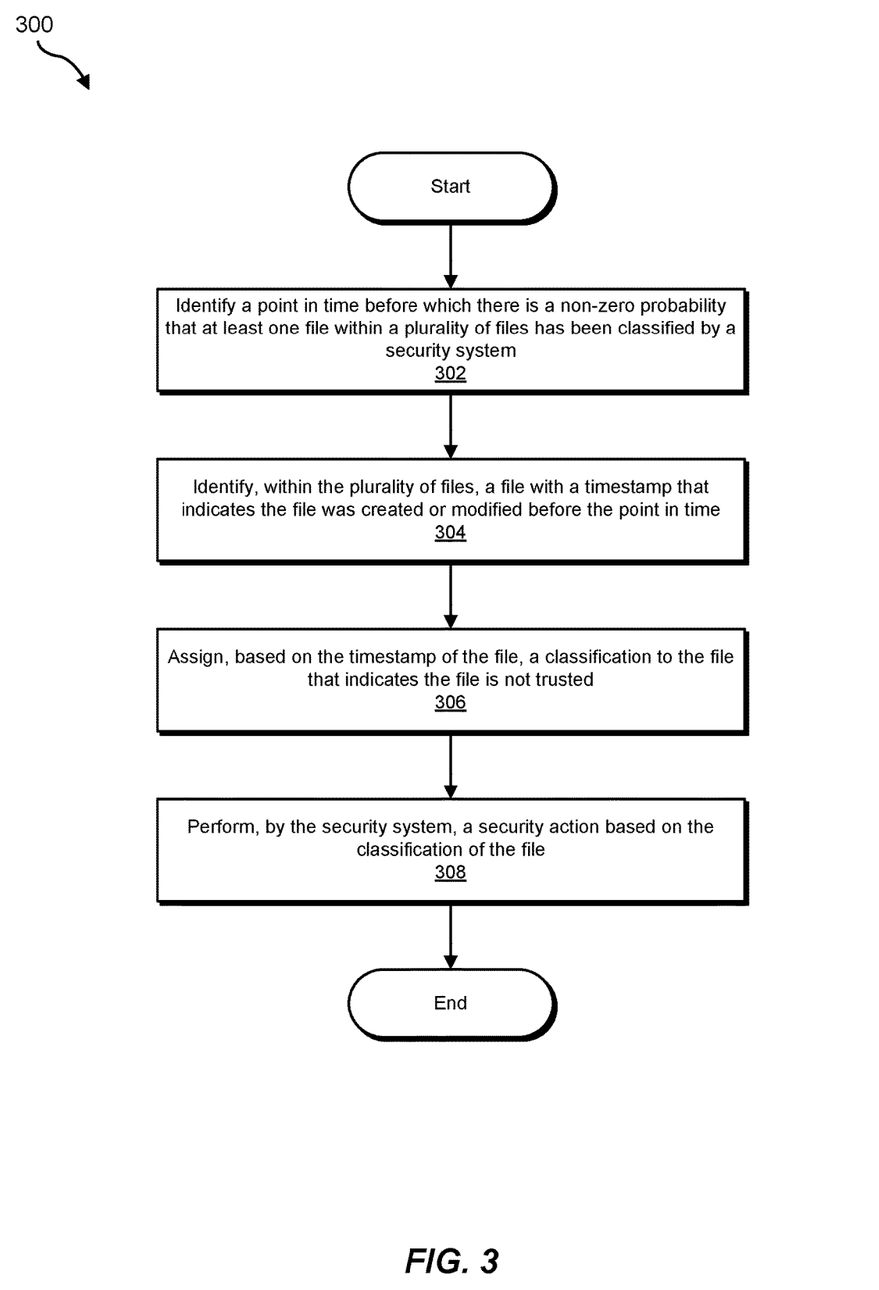
FIG. 3 is a flow diagram of a representative method for classifying files.

FIG. 3 is a flow diagram of a representative computer-implemented method 300 for classifying files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of representative network architecture 600 in FIG. 6.

As illustrated in FIG. 3, at step 302, one or more of the systems described herein may identify a point in time before which there is a non-zero probability that at least one file within a set of files has been classified by a security system. For example, identification module 104 may, as part of computing device 202 or server 206 in FIG. 2, identify point in time 210 before which there is a non-zero probability that files within a set of files 208 have been classified by a security system.

As used herein, the terms "plurality of files," "set of files," and "group of files" generally refer to files identified on one or more computing devices that contain data and/or executable code that may be analyzed by a security system as potentially containing malware. Groups of files may include, without limitation, executable files, program files, library files, scripts, images, videos, and macros. Files may also include container files that may include any of the above as a component.

The term "security system" as used herein generally refers to one or more computing systems that analyze data repositories, files, computing systems, and/or networks to identify potential security threats. Examples of security systems include anti-malware systems, data-loss-prevention systems, spam filtering systems, and the like. As shown in FIG. 2, server 206 may represent a security system and database 120 may represent a database of information (such as file identification and timestamp data) associated with files located on one or more client systems.

Identification module 104 may identify point in time 210 in a variety of ways. For example, identification module 104 may search security system database 120 on server 206 for file records with no security classification or an unknown classification and identify the earliest point in time where all or a percentage of files have been classified. In another example, identification module 104 may sample file records in database 120 to determine a probability that files before a specified date have been classified. In another example, identification module 104 may identify point in time 210 during or after a scan of files on one or more computing systems by identifying a point in time before which files remain unclassified, due, for example, to having been missed in previous scans or because previous scans were unable to classify the files as benign or malicious.

The terms "classification" or "security classification," as used herein, generally refer to labels assigned to files by a security system. Classifications may include malicious, benign, trusted, untrusted, unknown, suspicious, etc. Security systems may permit administrators to set security policies that specify actions to be taken or permitted, depending on the file classification. For example, files classified as malicious may be immediately moved to a quarantine area and an administrator notified that further action should be taken. A security policy may specify different actions to be taken, depending on factors other than the security classification. For example, an administrator may be permitted to execute a file classified as untrusted, but other users may be blocked from executing the file. In some examples, files in file set 208 may have been classified by a client agent executing on a computing system, by a security system executing in a local network, or by a remote security service.

In one embodiment, identification module 104 may identify the point in time 210 by identifying a most recent time a security scan on at least one of the files within set of files 208 was performed. For example, computing device 202 may manage an information security system for a number of client systems and therefore be aware of the date and time that security scans of file systems on the client systems have been performed. Computing device 202 may therefore also be aware of the percentage of files on the client systems with no security classification and may select a point in time where a security scan has found a significant portion (e.g., a majority) to have security classifications. Depending on factors such as the number of unclassified files that are included in a group of files, how often security scans are performed, and the effectiveness of the security system at classifying files, identification module 104 may select a recent point in time or, for example, a point in time years in the past, before which there remain only a few unclassified files that may have not been scanned, have been scanned one or more times, and/or have been subjected to other approaches to malware detection. As new files are analyzed and categorized, identification module 104 may periodically identify a new point in time 210, so that the probability files with timestamp before point in time 210 have been categorized remains constant, and therefore system resources may continue to be available to identify new threats.

In one embodiment, the point in time may be selected based on the probability that files with timestamps prior to the point in time have already been assigned classifications. The point in time may be selected based on a high or significant probability that files with timestamps prior to the point in time have already been assigned classifications. In one example, the probability may be at least 95.4 percent. A 95.4 percent probability represents two standard deviations beyond the mean in a normal distribution (also referred to as 2-sigma), a value representing a minimal level of certainty that files have previously been classified. When identification module 104 selects a point in time 210 before which a percentage of files have not been assigned a security classification, there is a non-zero probability that one of the unclassified files contains malware or represents some other type of security threat.

By selecting point in time 210 at a point where the percentage of previously unclassified files can be known or accurately estimated, identification module 104 may estimate the probability that one of the previously unclassified files represents a security threat. Identification module 104 may then select point in time 210 to achieve a desired level of security while maximizing system performance. For example, where a high level of security is desired, identification module 104 may select point in time 210 at a point where files have a 99.99966 percent (or 6-sigma) probability of having previously been classified. Identification module 104 may achieve intermediate levels of security by selecting point in time 210 at a point where files have 99.7 percent (3-sigma), 99.994 percent (4-sigma), or 99.9994 percent (5-sigma) probabilities of having previously been classified.

At step 304, one or more of the systems described herein may identify, within the set of files, a file with a timestamp that indicates the file was created or modified before the point in time. For example, comparison module 106 may, as part of computing device 202 or server 206 in FIG. 2, identify, within files set 208, file 212 with timestamp 214 that indicates file 212 was created or modified before point in time 210.

The term "timestamp," as used herein, generally refers to a file metadata item the indicates a date and time the file was created or last modified. As used herein, the term "created" generally refers to when a file is first saved or copied to a file system. The term "modified" generally refers to when the contents of an existing file are changed, or another event causes the file's timestamp to be changed. For example, renaming a file or modifying an item in a file's metadata may change a file's timestamp to the current time, even though the contents of the file have not changed.

Comparison module 106 may identify files with timestamps earlier than the selected point in time in a variety of ways. For example, comparison module 106 may search security system database 120 on server 206 for records of files on client systems with timestamps indicating that the files were created or modified before point in time 210. In another example, comparison module 106 may direct client agents executing on client systems to identify files with timestamps indicating that the files were created or modified before point in time 210.

As another example, a file may have been classified by a heuristic that has been trained and updated on additional files since the file was classified. In this example, the file may be identified as having a timestamp prior to point in time 210 and may have an untrusted or dated classification. Such files may be reclassified as untrusted files.

In some examples, comparison module 106 may identify files that were assigned weak, indeterminate classifications (e.g., classifications that indicate the files may potentially be good or malicious). Such files may be reclassified as untrusted files.

Figure 4:
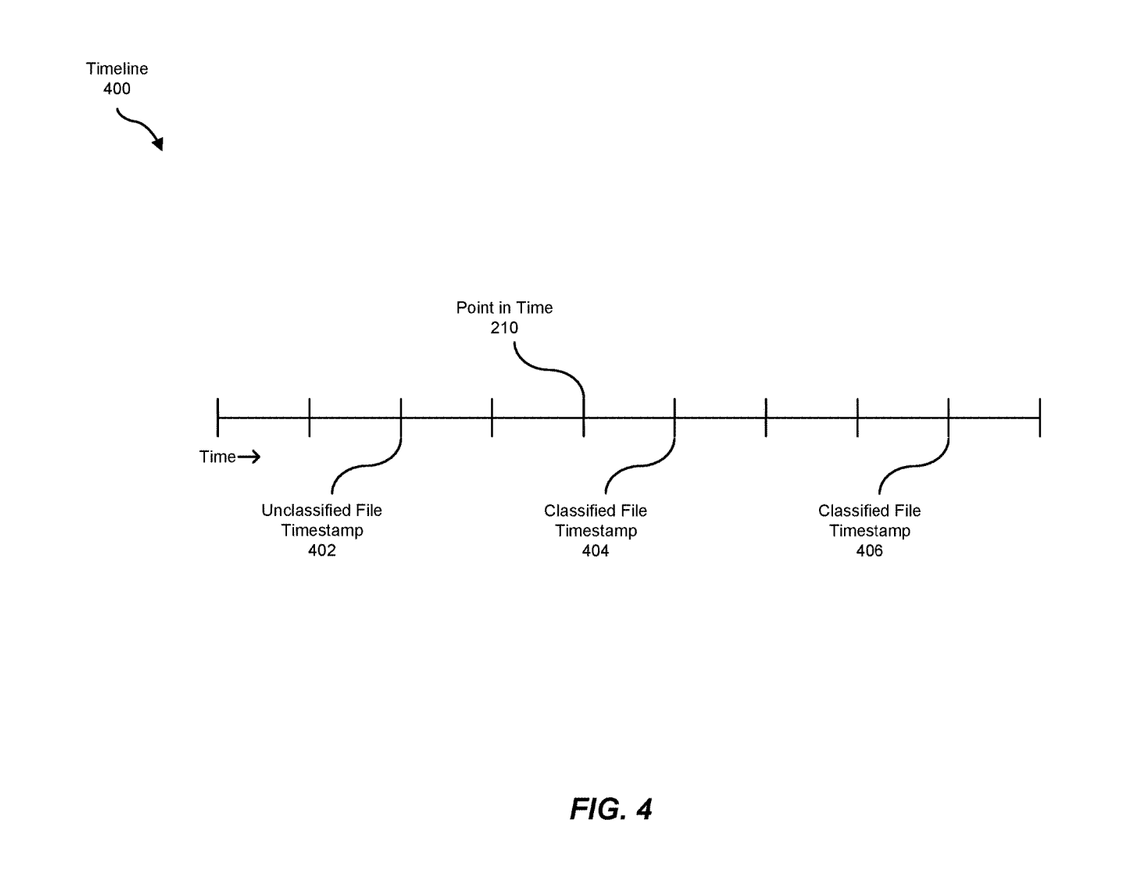
FIG. 4 is a representative timeline for classifying files.

FIG. 4 is an illustration of a representative timeline 400 corresponding to systems and methods for classifying files. As shown in FIG. 4, point in time 210 may represent the time identification module 104 selected before which a non-zero percentage of files have already been classified by a security system. Unclassified file timestamp 402 represents a point in time where the timestamps of one or more files indicate the files were created or last modified, but the files remain unclassified. Comparison module 106 may identify classified timestamps 404 and 406 representing two files that were created or modified after point in time 210 and have been classified by a security system. Since the file associated with unclassified timestamp 402 has not yet been assigned a classification and its timestamp is prior to point in time 210, the file is likely to have been scanned and analyzed several times (or may not have been analyzed at all) and may represent a potential security threat.

At step 306, one or more of the systems described herein may assign, based on the timestamp of the file, a classification to the file that indicates the file is not trusted. For example, classification module 108 may, as part of computing device 202 or server 206 in FIG. 2, assign, based on timestamp 214 of file 212, classification 216 to file 212 that indicates file 212 is not trusted.

Classification module 108 may classify files as not trustworthy in a variety of ways. For example, classification module 108 may make an entry in a security system database 120 on server 206 in a field of a record associated with a file on a client system, indicating that the file is not trusted. In one embodiment, the file may not have been assigned a classification before being assigned the classification that indicates the file is not trusted. Assigning the classification to the file in this case may involve of assigning an initial classification to the file. For example, classification module 108 may classify a file as not trustworthy when the file has not been classified, but is included in a group of files where there is a high expectation that malware would already have been identified. For example, the file may have been skipped or eluded detection during previous scans, or the security system may have been unable to classify the file as benign or malicious after one or more previous scans.

In one embodiment, classification module 108 may perform an analysis of classifications assigned to files in the group of files before the point in time, determine that a classified file has been assigned different classifications by at least two security agents, and, in response to determining that the classified file has been assigned different classifications, assigns an updated classification to the classified file that indicates the file is not trusted. For example, classification module 108 may determine that client agents of the security system have been classifying a file with a timestamp before the point in time as benign or safe, while the file is identified as having an unknown reputation on the security system's server. In addition to client-based or server-based agents of the security system, classification module 108 may consult a variety of sources for file classification information, such as information obtained from other security services or analyses performed by security experts.

Classification module 108 may assign various classifications to a file. As described above, classifications may include such labels as malicious, benign, trusted, untrusted, unknown, suspicious, etc. Classification module 108 may classify a file as untrusted, indicating that security measures should be taken in connection with using or executing the file. For example, a user may be warned that the file is untrusted and that the user must provide permission before execution is permitted. However, classification module 108 may assign a classification indicating a reduced level of trust, but not that the file is completely untrusted, as with a file identified as containing malware.

At step 308, one or more of the systems described herein may perform, via the security system, a security action based on the classification of the file. For example, security module 110 may, as part of computing device 202 or server 206 in FIG. 2, perform, via the security system, security action 218 based on classification 216 of file 212.

Security module 110 may perform a variety of security actions, and in a variety of ways. In general, security module 110 may perform any suitable action on suspicious or potentially harmful files to reduce the potential threat to information security and/or computing devices. For example, security module 110 may block execution of the file on the client on which the file was identified. In another example, security module 110 may direct a security system to block execution of the file on any client on which the file may be found. Depending on factors such as the desired level of security for the execution environment and/or the sophistication of a user attempting to execute the file, security module 110 may permit the untrusted file to execute after receiving permission from a user or administrator. Additionally or alternatively, security module 110 may submit the file to a security service for further analysis. For example, a security service may analyze execution paths within a program file to determine whether the file includes malicious code. A security service may also execute an untrusted file within a sandbox or quarantined area to detect any malicious actions the file may initiate. Human experts may also manually inspect the file in an attempt to properly classify the file.

In one embodiment, the security action may include using the assigned classification to prioritize a security analysis of the file. For example, security module 110 may schedule a file classified as untrusted with timestamps before the point in time for immediate analysis by an automated malware detection service. If the analysis indicates that the file does not include malware, security module 110 may reclassify the file as trusted, so that users may be permitted to execute the file. By prioritizing security analyses of files identified as untrusted and with timestamps before the identified point in time, security module 110 may increase the efficiency and effectiveness of the security system. Resources may thereby be directed where threats are most likely to appear. By prioritizing security analyses of files most likely to represent a security threat, users are prevented from executing files most likely to contain security threats and may more quickly be permitted to execute files that security analyses determine to be benign.

As described in greater detail above, the systems and methods described herein may identify files that remain unclassified by security systems despite having remained unmodified for a period of time in which there is a non-zero probability that the file should have been classified. Because security systems may be expected to classify nearly all files as safe or malicious over time, files that remain unclassified after one or more security scans may represent undetected threats. By selecting a point in time where a high percentage of files have already been analyzed and classified, the systems and methods described herein may assure that system resources give the highest priority to analyzing files that are most likely to represent security threats. As new threats are identified in files that may have undergone repeated security scans or have not been scanned (e.g., files on newly protected systems), security systems may identify methods for identifying similar threats.

Figure 5:
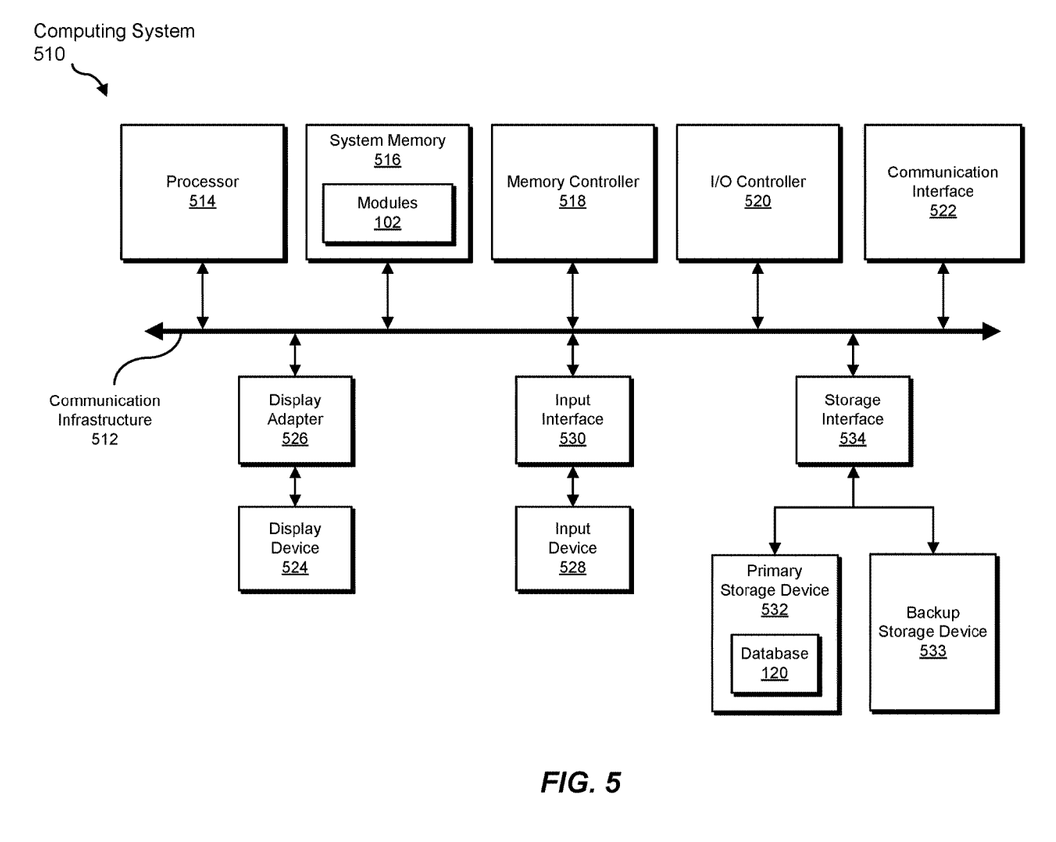
FIG. 5 is a block diagram of a representative computing system capable of implementing one or more of the embodiments described and/or illustrated herein.

FIG. 5 is a block diagram of a representative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the representative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, representative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between representative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, representative computing system 510 may also include at least one input device 528 coupled to communication infrastructure 512 via an input interface 530. Input device 528 generally represents any type or form of input device capable of providing input, either computer or human generated, to representative computing system 510. Examples of input device 528 include, without limitation, a keyboard, a pointing device, a speech recognition device, or any other input device.

As illustrated in FIG. 5, representative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 510 may be configured as an Application Specific Integrated Circuit (ASIC) adapted to implement one or more of the representative embodiments disclosed herein.

Figure 6:
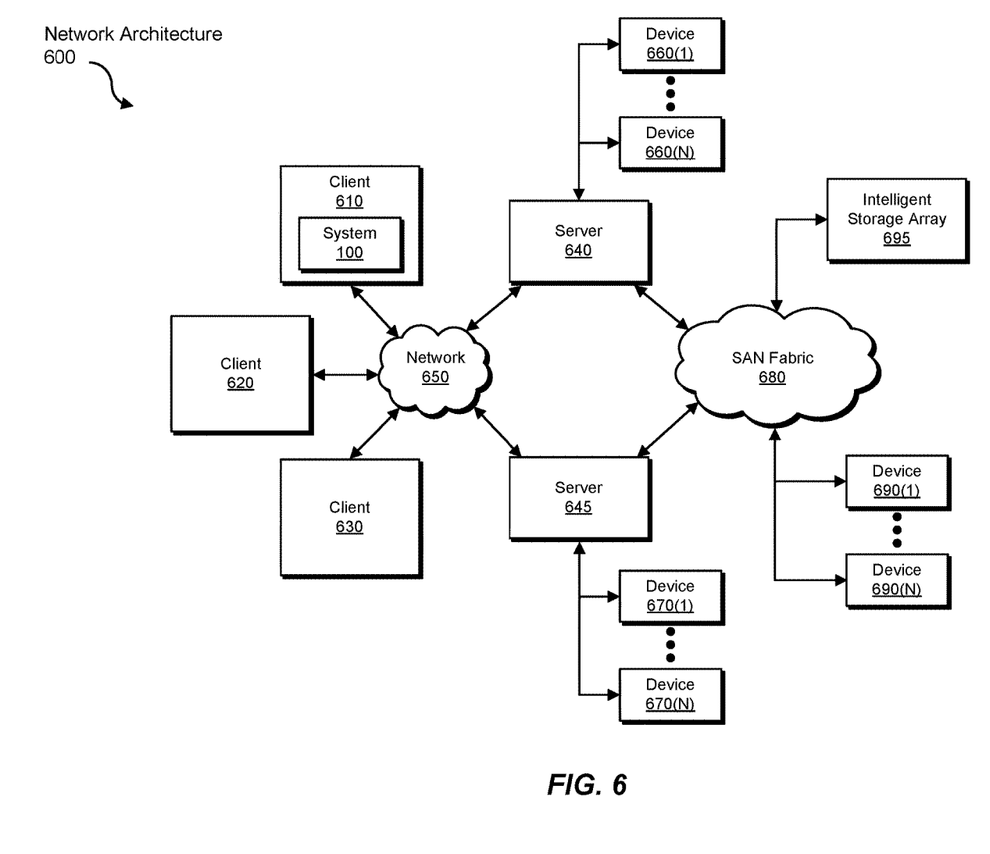
FIG. 6 is a block diagram of a representative computing network capable of implementing one or more of the embodiments described and/or illustrated herein.

FIG. 6 is a block diagram of a representative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as representative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to representative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the representative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a representative method for classifying files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of representative system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of representative system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of representative system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of representative system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of representative system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive file data to be transformed, transform the file data, output a result of the transformation to identify file classification information, use the result of the transformation to classify files, and store the result of the transformation to increase the efficiency of information security systems. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects representative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting a computing system from untrusted computer files, at least a portion of the method being performed by a computing device comprising at least one processor, the method comprising:
   identifying a point in time before which at least one security scan of file a plurality of computer files has been performed by a security system;
   identifying, within the plurality of computer files, by the computing device, a computer file that:
      has a timestamp indicating that the computer file was created or last modified before the point in time; and
      is currently not assigned a security classification;
   assigning, by the computing device, a security classification to the computer file that indicates the computer file is not trusted; and performing, by the security system, a security action to protect the computing system from the computer file based on the assigned security classification of the computer file.

2. The computer-implemented method of claim 1, wherein
the computer file had not been assigned a previous security classification before being assigned the security classification that indicates the computer file is not trusted because the security scan missed the computer file.

3. The computer-implemented method of claim 1, wherein the computer file had not been assigned a previous security classification before being assigned the security classification that indicates the computer file is not trusted because the security scan was unable to classify the computer file.

4. The computer-implemented method of claim 1, wherein identifying the point in time is based on a probability that a computer file of the plurality of computer files has been assigned a security classification that exceeds a probability threshold.

5. The computer-implemented method of claim 4, wherein the probability threshold is at least 95.4 percent.

6. The computer-implemented method of claim 1, wherein:
identifying the point in time comprises identifying a most recent time a security scan of the plurality of computer files was performed; and
the point in time comprises the most recent time of the security scan.

7. The computer-implemented method of claim 1, wherein the security action comprises using the assigned security classification to prioritize a security analysis of the computer file.

8. The computer-implemented method of claim 1, wherein the security action comprises at least one of:
blocking execution of the computer file on at least one client;
directing at least one client to obtain confirmation from a user before executing the computer file; and
submitting the computer file to a security service for further analysis.

9. A system for protecting a computing system from untrusted computer files, the system comprising:
an identification module, stored in memory, that identifies a point in time before which at least one security scan of a plurality of computer files has been performed by a security system;
a comparison module, stored in memory, that identifies, within the plurality of computer files, a computer file that:
has a timestamp indicating that the computer file was created or last modified before the point in time; and
is not currently assigned a security classification;
a classification module, stored in memory, that assigns a security classification to the computer file that indicates the computer file is not trusted;
a security module, stored in memory, that performs, by the security system, a security action to protect the computing system from the computer file based on the assigned security classification of the computer file; and
at least one physical processor of a computing device configured to execute the identification module, the comparison module, the classification module, and the security module.

10. The system of claim 9, wherein
the security system had not assigned the computer file a previous security classification before assigning the security classification that indicates the computer file is not trusted because the security scan missed the computer file.

11. The system of claim 9, wherein the security system had not assigned the computer file a previous security classification before assigning the security classification that indicates the computer file is not trusted because the security scan was unable to classify the computer file.

12. The system of claim 9, wherein the identification module identifies the point n time based on a probability that a computer file of the plurality of computer files has been assigned a security classification that exceeds a probability threshold.

13. The system of claim 12, wherein the probability threshold is at least 95.4 percent.

14. The system of claim 9, wherein:
the identification module identifies the point in time by identifying a most recent time a security scan of the plurality of computer files was performed; and
the point in time comprises the most recent time of the security scan.

15. The system of claim 9, wherein the security module performs the security action by using the assigned security classification to prioritize a security analysis of the computer file.

16. The system of claim 9, wherein the security module performs the security action by at least one of:
blocking execution of the computer file on at least one client;
directing at least one client to obtain confirmation from a user before executing the computer file; and
submitting the computer file to a security service for further analysis.

17. A non-transitory computer-readable medium comprising one or more computer-readable instructions that, when executed by at least one processor of a computing device, cause the computing device to:
identify a point in time before which at least one security scan of a plurality of computer files has been performed by a security system;
identify, within the plurality of computer files, a computer file that:
has a timestamp indicating that the computer file was created or last modified before the point in time; and
is currently not assigned a security classification;
assign a security classification to the computer file that indicates the computer file is not trusted; and
perform, by the security system, a security action to protect a computing system from the computer file based on the assigned security classification of the computer file.

18. The non-transitory computer-readable medium of claim 17, wherein
the computer file had not been assigned a previous security classification before being assigned the security classification that indicates the computer file is not trusted because the security scan missed the computer file.

19. The non-transitory computer-readable medium of claim 17, wherein the computer file had not been assigned a previous security classification before being assigned the security classification that indicates the computer file is not trusted because the security scan was unable to classify the computer file.

20. The non-transitory computer-readable medium of claim 17, wherein the one or more computer-readable instructions cause the computing device to identify the point in time based on a probability that a computer file of the plurality of computer files has been assigned a security classification that exceeds a probability threshold.

\* \* \* \* \*

UNITED STATES PATENT AND TRADEMARK OFFICE
CERTIFICATE OF CORRECTION

PATENT NO. : 10,073,968 B1
APPLICATION NO. : 15/192859
DATED : September 11, 2018
INVENTOR(S) : Magar Page 1 of 1

It is certified that error appears in the above-identified patent and that said Letters Patent is hereby corrected as shown below:

In Column 16, Line 58, in Claim 1, delete "of file a" and insert -- of a --, therefor.

In Column 18, Line 13, in Claim 12, delete "point n time" and insert -- point in time --, therefor.

Signed and Sealed this
Thirteenth Day of November, 2018

Andrei Iancu
*Director of the United States Patent and Trademark Office*